_United States Patent Office_

3,446,768
Patented May 27, 1969

3,446,768
PROCESS FOR THE PRODUCTION OF AN AQUEOUS DISPERSION OF A POLYMER OF A VINYL ESTER
Werner Ehmann, Frankfurt am Main, Germany, assignor to Farbwerke Hoechst Aktiengesellschaft vormals Meister Lucius & Brüning, Frankfurt am Main, Germany, a corporation of Germany
No Drawing. Filed May 24, 1966, Ser. No. 552,394
Claims priority, application Germany, May 26, 1965,
F 46,159
Int. Cl. C08f 1/13, 29/42
U.S. Cl. 260—29.6          9 Claims

ABSTRACT OF THE DISCLOSURE

A process has been provided for the production of an aqueous dispersion of a polymer of a vinyl ester, which comprises the step of polymerizing at least one vinyl ester of a monocarboxylic acid with 2 to 19 carbon atoms, a product of a vinyl ester, and up to 35%, calculated on the weight of the vinyl ester, of at least one other monoolefinically unsaturated monomer copolymerizable with a vinyl ester in an aqueous phase at a temperature within the range of 40° C. to 95° C. under the action of 0.002 to 1 percent, calculated on the weight of the monomers, of a water-soluble free radical polymerization catalyst in the presence of 0.5 to 18 percent by weight, calculated on the polymerizable monomers, of a reaction product of polyvinyl alcohol and 0.1 to 10% by weight, calculated on the polyvinyl alcohol, of a monoolefinically unsaturated aldehyde containing 3 to 8 carbon atoms. The aqueous dispersions obtained according to the novel process are also within the scope of the invention.

---

The present invention relates to a process for the production of an aqueous dispersion of a polymer of a vinyl ester in the presence of a modified polyvinyl alcohol as protective colloid.

In the emulsion polymerization of vinyl esters alone or together with other unsaturated compounds, protective colloids are used which are to prevent coagulation of the dispersion. Especially for the preparation of highly viscous polyvinyl ester dispersions, for example in the field of adhesives, polyvinyl alcohol or its derivatives are preferred as protective colloids. Such a process has been described, for example, in German Patent 727,955. The viscosity of the dispersion increases with the amount and the molecular weight of the polyvinyl alcohol used (cf. German Patent 1,071,954). To keep the amount of the protective colloid used within economically reasonable limits, polyvinyl alcohol of high molecular weight is used which is obtained by saponifying polyvinyl acetate of high molecular weight. Several disadvantages are incurred thereby, on account of the viscosity the manufacture of polyvinyl acetate of high molecular weight is more difficult and, therefore, more expensive than the manufacture of polyvinyl acetate of low molecular weight. When saponifying polyvinyl acetate of high molecular weight, a considerable increase of the viscosity sets in which renders it necessary to operate in dilute solutions. Finally highly viscous, aqueous solutions of polyvinyl alcohol as used for the preparation of dispersions, are more difficult to manipulate than solutions of polyvinyl alcohol of low viscosity.

Now I have found that an aqueous dispersion of a homo- or copolymer of at least one vinyl ester can be obtained advantageously by polymerizing at least one vinyl ester in an aqueous emulsion with the use of protective colloids if, as protective colloid, there is used 0.5 to 18 percent by weight, preferably 2 to 14 percent by weight, calculated on the polymerizable monomers, of a modified polyvinyl alcohol, i.e. a reaction product of polyvinyl alcohol and 0.1 to 10 percent by weight, preferably 0.3 to 5 percent by weight, calculated on the polyvinyl alcohol, of a mono-olefinically unsaturated aldehyde containing 3 to 8 carbon atoms.

In the following and in the claims the term polyvinyl alcohol is intended to mean the saponification products of vinyl ester homopolymers, for example of polyvinyl acetate, moreover of copolymers or graft polymers of vinyl esters, in which case the saponification products may also contain up to 20 percent by weight, calculated on the saponification product, of acyl groups, preferably acetyl groups. The saponification products may also contain up to 8 percent, preferably up to 4 percent, calculated on the weight of the saponification product, of acetal groups which are derived from aliphatic saturated monoaldehydes having 1 to 5 carbon atoms, for example from formaldehyde, propionaldehyde or pentanal (1). The copolymers to be saponified may have been obtained by copolymerizing various vinyl esters, for example vinyl propionate, vinyl butyrate, vinyl isobutyrate, vinyl laurate, vinyl stearate, vinyl esters of branched aliphatic saturated monocarboxylic acids having 9 to 19 carbon atoms, vinyl esters of trimethyl acetic acid or, preferably, by copolymerizing vinyl acetate with one of the aforementioned vinyl esters. Furthermore, the copolymers to be saponified may also be prepared by copolymerizing one or several of the aforementioned vinyl esters with up to 50 percent by weight, calculated on the vinyl ester, of other mono-olefinically unsaturated monomers copolymerizable with vinyl esters, for example N-vinyl-N-alkyl acid amides, preferably of the formula

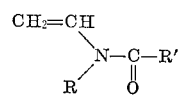

wherein R represents an alkyl group containing 1 to 4 carbon atoms and R' represents H or an alkyl group containing 1 to 4 carbon atoms, crotonic acid, esters of maleic acid or fumaric acid and aliphatic monohydric saturated alcohols containing 1 to 10 carbon atoms.

The grafted copolymers to be saponified are obtained by grafting 5 to 95 percent by weight, calculated on the grafted copolymer, of at least one of the aforementioned vinyl esters, preferably vinyl acetate, if necessary with up to 30 percent by weight, calculated on the vinyl ester, of other monoolefinically unsaturated monomers copolymerizable with vinyl esters on suitable backbone polymers. Exemplary of the backbone polymers that may be used are homopolymers of N-vinyl-N-alkyl acid amides, preferably those of N-vinyl-N-alkyl acid amides of the formula

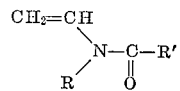

wherein R represents an alkyl group containing 1 to 4 carbon atoms and R' represents H or an alkyl group containing 1 to 4 carbon atoms. Further suitable backbone polymers are copolymers of N-vinyl-N-alkyl acid amides, especially those of the formula

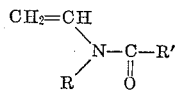

wherein R represents an alkyl group containing 1 to 4 carbon atoms and R' represents H or an alkyl group containing 1 to 4 carbon atoms, for example copolymers of at least 80 percent by weight of N-vinyl-N-alkyl acid amides, preferably of the above-mentioned formula, and at most 20 percent by weight of 2-ethyl-hexylacrylate or copolymers of at least 80 percent by weight of N-vinyl-N-alkyl acid amides preferably of the abovementioned formula and at most 20 percent by weight of di-2-ethyl-hexyl maleate. Further examples of suitable backbone polymers are water-soluble polyalkylene oxides, for example polyethylene oxide or block copolymers of ethylene oxide, preferably block copolymers of ethylene oxide and propylene oxide.

By mono-unsaturated aldehydes there are to be understood aliphatic aldehydes containing one carbon-to-carbon double bond and 3 to 8 carbon atoms, such as butene-(3)al(1), pentene(2)al(1), tiglic aldehyde, hexene(2)al-(1), α-ethyl acrolein, α-methyl-β-ethyl acrolein, α-propyl-acrolein, but preferably crotonic aldehyde and, especially, acrolein.

The modified polyvinyl alcohol, i.e. the reaction product of polyvinyl alcohol and unsaturated aldehyde, is obtained, for example, by subjecting one of the aforementioned homopolymers, copolymers or grafted copolymers in methanol, in the presence of an alkaline or acid catalyst, to an alcoholysis and reacting the polyvinyl alcohol obtained thereby in the presence of acid catalysts usually employed for acetallization at an elevated temperature, preferably at a temperature within the range of 40° C. to 100° C., with the unsaturated aldehyde or a mixture of different unsaturated aldehydes. However, it is also possible to proceed in such a manner that during the alcoholysis in the presence of a catalyst having an acid reaction, unsaturated aldehyde is present which reacts with the polyvinyl alcohol formed.

0.1 to 10 percent by weight, preferably 0.3 to 5.0 percent of unsaturated aldehyde, calculated on the polyvinyl alcohol, are employed in the reaction. The amount of unsaturated aldehyde, the type of the polymers to be saponified and the degree of saponification thereof are chosen such that the reaction products formed are soluble in water at temperatures not exceeding 40° C.; solubility at a temperature above 40° C. is not generally required for the modified polyvinyl alcohol used according to the process of the present invention.

By the term "polyvinyl ester dispersions" which are prepared in the presence of the reaction products from polyvinyl alcohol and at least one unsaturated aldehyde used in accordance with the present invention, there are to be understood aqueous polymer dispersions having in general a solid content of 35 to 65 percent by weight, calculated on the total weight of the dispersion, which are obtained by polymerizing vinyl acetate, vinyl propionate, vinyl butyrate, vinyl isobutyrate, vinyl benzoate, vinyl stearate, vinyl laurate, vinyl esters of branched aliphatic monocarboxylic acids containing 9 to 19 carbon atoms, vinyl esters of trimethyl acetic acid, of iso-nonanoic acid or isooctanoic acid, however, preferably dispersions of polymers containing at least 50 percent by weight of vinyl acetate or vinyl propionate. The vinyl ester polymers prepared in the presence of the reaction products from polyvinyl alcohol and at least one unsaturated aldehyde used according to the present invention, may comprise, in addition to one or several vinyl esters, also up to 35 percent by weight, calculated on the vinyl ester portion, of at least one other monoolefinically unsaturated monomer copolymerizable with a vinyl ester. Examples of monoolefinically unsaturated monomers which are copolymerizable with vinyl esters are acrylic acid, methacrylic acid, maleic acid, fumaric acid, furthermore esters of the aforesaid acids and aliphatic monohydric saturated alcohols containing 1 to 10 carbon atoms, furthermore acrylamide, methacrylamide, crotonic acid or vinyl chloride.

The reaction products of polyvinyl alcohols and unsaturated aldehydes are used, as stated above, in amounts within the range of 0.5 to 18 percent by weight, preferably 2 to 14 percent by weight, calculated on the monomer or mixture of monomers, as protective colloid for the preparation of the dispersion. In this process there may be present, in addition to the reaction products obtained from polyvinyl alcohol and unsaturated aldehydes, additional emulsifiers and protective colloids in an amount within the range of from 0.5 to 3,000 percent by weight, calculated on the reaction product of polyvinyl alcohol and the unsaturated aldehyde or the unsaturated aldehydes, for example soluble derivatives of starch or cellulose, non-ionogenic emulsifiers such as alkyl-, aryl- and alkylaryl polyethylene oxide ethers, polyalkylene oxides, block copolymers of different polyalkylene oxides, ionogenic emulsifiers such as alkyl sulfates or alkyl-aryl sulfates or sulfonates, polyvinyl pyrrolidone, polymers and copolymers of open-chain N-vinyl-N-alkyl acid amides, polyvinyl alcohol and its derivatives.

The polyvinyl ester dispersions, containing the reaction products of polyvinyl alcohol and at least one unsaturated aldehyde according to the invention, are prepared in known manner, for example with 0.002 to 1 percent, preferably 0.005 to 0.5 percent, calculated on the weight of the monomer, of a water-soluble free radical polymerization catalyst, such as per compounds or redox systems, for example hydrogen peroxide, water-soluble persulfates such as ammonium persulfate, sodium persulfate, potassium persulfate, furthermore alkali peroxides, for example sodium peroxide or potassium peroxide, cobalt (II) salts/hydrogen peroxide, iron(II) salts/hydrogen peroxide, formaldehyde sodium sulfoxylate/potassium perchlorate, ascorbic acid/persulfate, generally at temperatures within the range of from 40° to 95° C. The monomer or monomers to be polymerized are added prior to the polymerization to the aqueous solution of the protective colloid containing the catalyst. However, they may also be supplied gradually during the polymerization. It is advantageous to place the total amount of the reaction product of polyvinyl alcohol and unsaturated aldehyde in the polymerization vessel. However, the process may also be carried out such that only part of the reaction product, for example 10 percent by weight thereof, is placed in the polymerization vessel while the remaining portion, for example 90 percent by weight, is metered in as the polymerization proceeds. According to another modification of the process according to the invention, it is also possible to place at least 30 percent by weight of the reaction product of polyvinyl alcohol and unsaturated aldehyde in the polymerization vessel and, after the polymerization is complete, to add the remaining portion to the finished dispersion.

It is a considerable advance in the art if, by saponification or alcoholysis, for example of polyvinyl acetate of relatively low molecular weight, there is obtained a polyvinyl alcohol which likewise has a relatively low viscosity, by means of which it is possible, however, to prepare highly viscous polyvinyl ester dispersions. By the amount of unsaturated aldehyde which is reacted with the polyvinyl alcohol, the viscosity of the dispersions prepared according to the present invention in the presence of the aforementioned reaction products can be controlled. If the problem is to prepare a series of dispersions which shall only differ from one another with regard to the latex viscosity, it has now become possible to start from a single vinyl ester polymer. The vinyl ester polymer is saponified or subjected to an alcoholysis and reacted with different amounts of unsaturated aldehyde. The same amounts of these reaction products can now be used for the preparation of the dispersion and, nevertheless, there are obtained different latex viscosities. When working according to the known methods, it would have been necessary to prepare vinyl ester polymers, for example polyvinyl acetate, of different molecular weights, or use different amounts of polyvinyl alcohol for the preparation of the dispersion. The result thereof would have been further differences in the quality of the dispersion.

The polyvinyl ester dispersions prepared with the use of the reaction products applied according to the present invention are distinguished, moreover, by a special bond strength and can, therefore, be used with special advantage as adhesives.

The following examples serve to illustrate the invention, but they are not intended to limit it thereto:

EXAMPLE 1A

A solution of 150 grams polyvinyl alcohol in 1,600 grams water was introduced into a glas flask (capacity: 6 liters) equipped with thermometer, reflux condenser and agitator (150 r.p.m.). The polyvinyl alcohol contained 14.1% by weight of acetyl groups and was prepared by saponifying a polyvinyl acetate having a K value (according to Fikentscher, "Cellulosechemie," vol. 13 [1932], p. 58 of 62) (measured at 20° C. in a solution of 1% strength in ethyl acetate).

The solution of polyvinyl alcohol was adjusted by means of acetic acid to a pH of 3.5. Then 50 mg. ammonium-iron(II)-sulfate, 2 ml. hydrogen peroxide of 30% strength and 500 grams vinyl acetate were added thereto. The reaction mixture was heated in a heating bath, with agitation. The bath temperature was 70° C. When the internal temperature had attained 67° C., 1 kilogram of vinyl acetate was run in during the course of 2 hours. After the introduction of vinyl acetate had been terminated, the bath temperature was raised to 80° C. The internal temperature increased to 85° C. Agitation was continued for one hour, then 10 ml. hydrogen peroxide of 3% strength and 0.2 gram ascorbic acid were added. After the lapse of one hour, the dispersion was cooled. The dispersion could be spread well, it was free of little knots and, after it had been cooled to −20° C. and allowed to thaw, it was unchanged. The content of residual monomers was less than 0.8%; the solid content amounted to 49 to 50% by weight. The latex viscosity was 38 poises (measured at 20° C. in the Höppler viscosimeter).

For batches B to E polyvinyl alcohols were used which had been prepared from the same polyvinyl acetate. These polyvinyl alcohols differed from the polyvinyl alcohol under (1A) in that they had been reacted with varying amounts of crotonic aldehyde. The table following hereunder shows these values, as well as the latex viscosities of the dispersions prepared therewith in a manner analogous to that of batch (A).

For batch (F) a polyvinyl alcohol was used that had been reacted with acrolein.

For batches (G) and (H) polyvinyl alcohols were used that had been reacted with butyraldehyde. These tests show that the effect which increased the latex viscosity of the dispersions was only attained in the case of polyvinyl alcohols that had been converted with unsaturated aldehydes.

| Batch | Percent by weight | | | | | | | |
|---|---|---|---|---|---|---|---|---|
| | A | B | C | D | E | F | G | H |
| Crotonic aldehyde | | 1.1 | 2.2 | 3.5 | 4.8 | | | |
| Acrolein | | | | | | 0.9 | | |
| Butyric aldehyde | | | | | | | 3.1 | 4.2 |
| Residual acetyl groups contained in the polyvinyl alcohol | 14.1 | 12.7 | 11.2 | 7.9 | 8.0 | 11.0 | 9.1 | 7.9 |
| Viscosity of the dispersion in poises | 38 | 72 | 152 | 412 | >1,500 | 270 | 33 | 54 |

EXAMPLE 2A

Into a glass flask (capacity: 6 liters), equipped with thermometer, reflux condenser and agitator (150 r.p.m.), there were introduced:

(a) 80 grams polyvinyl alcohol, prepared by saponification of a polyvinyl acetate having a K value of 40 (measured at 20° C. in a solution of 1% strength in ethyl acetate). The polyvinyl alcohol contained 13% by weight of acetyl groups.

(b) 48 grams of a polyvinyl alcohol, prepared by saponification of a polyvinyl acetate (K value 62) and by reaction with 3.5% by weight of crotonic aldehyde.

(c) 16 grams of a copolymer of 90% by weight of N-vinyl-N-methyl acetamide and 10% by weight of 2-ethyl-hexylacrylate (K value 79) (measured at 20° C. in a solution of 1% strength in methanol).

These substances were dissolved in 1,100 grams of water. The solution was adjusted with formic acid to a pH of 3.2, 50 mg. cobaltous acetate, 2 ml. hydrogen peroxide of 30% strength and 1,500 grams vinyl acetate were added thereto and the reaction mixture was heated by means of a bath having a temperature of 75° C., with agitation. After about 3 hours the internal temperature attained its maximum value of 80° C. 1 ml. hydrogen peroxide of 30% strength was added thereto, and the reaction mixture was maintained at a temperature of 80° C. for one hour in order to complete the polymerization. The polymer dispersion formed had a solid content of 60% by weight; its latex viscosity amounted to 1,400 poises (measured at 20° C. in the Höppler viscosimeter).

EXAMPLE 2B

A dispersion was prepared in a manner analogous to that described in Example 2A. However, instead of the polyvinyl alcohol described in that example under (b), a polyvinyl alcohol was used that was obtained from the same polyvinyl acetate but which had not been reacted with crotonic aldehyde. The polyvinyl acetate dispersion formed in this case had a latex viscosity of 180 poises.

EXAMPLE 3A 120 grams of a polyvinyl alcohol, prepared by saponification of a polyvinyl acetate (K value 55) (measured at 20° C. in a solution of 1% strength in ethyl acetate) were introduced into a glass flask (capacity: 6 liters) equipped with thermometer, reflux condenser and agitator (150 r.p.m.). The polyvinyl alcohol contained 6.6% of acetyl groups and was converted with 2.5% weight of crotonic aldehyde. Furthermore, 7.5 grams of a reaction product of 1 mole nonyl phenol with 30 moles ethylene oxide were introduced into the flask and the whole was dissolved in 1,250 grams of water. The pH was adjusted at 3.6 by means of acetic acid. The 50 mg. cobaltous acetate, 3 ml. hydrogen peroxide of 30% strength and 300 grams vinyl propionate were added, and the reaction mixture was heated in a heating bath of 80° C., with agitation. After polymerization had set in, 1 kilogram vinyl propionate was run in during the course of 2 hours. After the maximum temperature had been attained (89° C.), 0.5 gram potassium persulfate was added and the polymerization was terminated at 85° C. during the course of another hour. The dispersion of polyvinyl propionate had a solid content of 54% by weight and a latex viscosity of 860 poises.

EXAMPLE 3B

A dispersion of polyvinyl propionate was prepared in a manner analogous to that described under 3A. However, in this case there was used a polyvinyl alcohol that had been obtained from the same polyvinyl acetate, which did not contain chemically bound crotonic aldehyde. The latex viscosity of this dispersion was 46 poises.

EXAMPLE 4A 1.5 grams sodium lauryl sulfate and 150 grams of a polyvinyl alcohol, prepared by saponification of a copolymer of 98% vinyl actetate and 2% crotonic acid (K value 70) (measured at 20° C. in a solution of 1% strength in ethyl acetate) were dissolved in 1.6 kilograms water in a glass flask (capacity: 6 liters), equipped with thermometer, reflux condenser and agitator (150 r.p.m.). The polyvinyl alcohol contained 8.9% by weight of acetyl groups and 3.3% by weight of crotonic aldehyde. The pH was adjusted at 3.2 by means of acetic acid, and 70 mg. cobaltous acetate and 2 ml. hydrogen peroxide of 30% strength were added thereto. The monomer mixture comprised 1,350 grams vinyl acetate, 140 grams vinyl ester of branched aliphatic monocarboxylic acids containing 9 to 19 carbon atoms and 5 grams acrylamide. Of this mixture there were first added 500 grams and, after polymerization (bath temperature 75° C.) had commenced, the remaining portion was added during the course of 3 hours. A solution of 1 gram potassium persulfate in 20 ml. water was added dropwise during the course of these 3 hours. After the maximum temperature had been attained, the mixture was after-polymerized at 85° C. for one hour. A pasty copolymer dispersion was obtained whose viscosity was practically no longer measurable in the Höppler viscosimeter.

EXAMPLE 4B

The dispersion was prepared in a manner analogous to that indicated under 4A. However, the polyvinyl alcohol that had been prepared from the same copolymer, contained 9.2% by weight of acetyl groups and 3.5% by weight of chemically bound acetaldehyde. The dispersion had a latex viscosity of 50 poises.

I claim:
1. A process for the production of an aqueous dispersion of a polymer of a vinyl ester, which comprises the step of polymerizing at least one vinyl ester of a monocarboxylic acid with 2 to 19 carbon atoms and a product of a vinyl ester and up to 35%, calculated on the weight of the vinyl ester, of at least one other monoolefinically unsaturated monomer copolymerizable with a vinyl ester in an aqueous phase at a temperature within the range of 40° C. to 95° C. under the action of 0.002 to 1 percent, calculated on the weight of the monomers, of a water-soluble free radical polymerization catalyst in the presence of 0.5 to 18 percent by weight, calculated on the polymerizable monomers, of a reaction product of polyvinyl alcohol and 0.1 to 10% by weight, calculated on the polyvinyl alcohol, of a monoolefinically unsaturated aldehyde containing 3 to 8 carbon atoms.

2. A process as claimed in claim 1 wherein polymerization is carried out in the presence of 2–14 percent by weight, calculated on the polymerizable monomers, of a reaction product of polyvinyl alcohol and 0.3 to 5 percent by weight, calculated on the polyvinyl alcohol, of a monoolefinically unsaturated aldehyde containing 3 to 8 carbon atoms.

3. A process as claimed in claim 1 wherein vinyl acetate is polymerized.

4. A process as claimed in claim 1 wherein vinyl propionate is polymerized.

5. A process as claimed in claim 1 wherein the polymerization is carried out in the presence of a reaction product of polyvinyl alcohol and crotonic aldehyde.

6. A process as claimed in claim 2 wherein the aldehyde is acrolein.

7. A process for the production of an aqueous dispersion of a polymer of a vinyl ester, which comprises the step of polymerizing at least one vinyl ester of a monocarboxylic acid with 2 to 19 carbon atoms in an aqueous phase at a temperature within the range of 40° to 95° C. under the action of 0.002 to 1 percent, calculated on the weight of the monomers, of a water-soluble free radical polymerization catalyst in the presence of 0.5 to 18 percent by weight, calculated on the polymerizable monomers, of a reaction product of polyvinyl alcohol and 0.1 to 10% by weight, calculated on the polyvinyl alcohol, of a monoolefinically unsaturated aldehyde containing 3 to 8 carbon atoms.

8. An aqueous dispersion produced according to claim 1.

9. An aqueous dispersion produced according to claim 7.

References Cited

UNITED STATES PATENTS 2,227,163 12/1940 Starck et al.
2,422,646 6/1947 Starck et al.
2,614,088 10/1952 Bristol et al.
3,010,929 11/1961 Jones.

SAMUEL H. BLECH, *Primary Examiner.*

H. ROBERTS, *Assistant Examiner.*

U.S. Cl. X.R.

260—78.5, 875, 876, 885